US010296270B2

(12) United States Patent
Harayama et al.

(10) Patent No.: US 10,296,270 B2
(45) Date of Patent: May 21, 2019

(54) NON-TRANSITORY COMPUTER READABLE MEDIUM STORED WITH PRINTING CONTROL PROGRAM, PRINTING CONTROL DEVICE, AND PRINTING CONTROL METHOD

(71) Applicant: MIMAKI ENGINEERING CO., LTD., Nagano (JP)

(72) Inventors: Kenji Harayama, Nagano (JP); Yoshikazu Furukawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/824,107

(22) Filed: Nov. 28, 2017

(65) Prior Publication Data

US 2018/0150270 A1 May 31, 2018

(30) Foreign Application Priority Data

Nov. 30, 2016 (JP) ................................ 2016-232652

(51) Int. Cl.
*G06F 3/12* (2006.01)
*H04N 1/00* (2006.01)

(52) U.S. Cl.
CPC .......... *G06F 3/1237* (2013.01); *G06F 3/1203* (2013.01); *G06F 3/1205* (2013.01); *G06F 3/1256* (2013.01); *G06F 3/1259* (2013.01); *G06F 3/1263* (2013.01); *G06F 3/1267* (2013.01); *G06F 3/1275* (2013.01); *H04N 1/00915* (2013.01)

(58) Field of Classification Search
CPC .... G06F 3/1237; G06F 3/1205; G06F 3/1256; G06F 3/1259; G06F 3/1275; G06F 3/1203; G06F 3/1263; G06F 3/1267; H04N 1/00915
USPC ....................................... 358/1.15
See application file for complete search history.

(56) References Cited

U.S. PATENT DOCUMENTS

| | | | | |
|---|---|---|---|---|
| 2007/0103718 A1* | 5/2007 | Uchida | .................. | G03G 15/50 358/1.14 |
| 2009/0086266 A1* | 4/2009 | Nakashima | ............ | G06K 15/02 358/1.15 |
| 2009/0257086 A1* | 10/2009 | Takeuchi | ........... | H04N 1/00222 358/1.15 |
| 2015/0170009 A1* | 6/2015 | Cudak | ................ | G06K 15/1809 358/1.15 |

(Continued)

*Primary Examiner* — Allen H Nguyen
(74) *Attorney, Agent, or Firm* — Rankin, Hill & Clark LLP

(57) ABSTRACT

Provided are a a non-transitory computer readable medium stored with a printing control program, a printing control device, and a printing control method that may reduce a length of time after a printing job is commenced and before another printing job starts to be executed in an inkjet printer. A printer control device includes a printing controller that prompts a 3D printer to perform a printing operation, and an interrupt time storing unit that stores an interrupt time of a printing job executed by the 3D printer when the printing job is interrupted by the printing controller. The printing controller restarts the printing job at the interrupt time stored by the interrupt time storing unit (S232). The printing controller prompts the 3D printer to execute another printing job after the printing job is interrupted and before the printing job interrupted is restarted.

7 Claims, 15 Drawing Sheets

(56) References Cited

U.S. PATENT DOCUMENTS

2017/0269475 A1* 9/2017 Kuo ........................ G06F 17/50
2018/0015655 A1* 1/2018 Gheorghescu ........ B29C 64/386

* cited by examiner

NON-TRANSITORY COMPUTER READABLE MEDIUM STORED WITH PRINTING CONTROL PROGRAM, PRINTING CONTROL DEVICE, AND PRINTING CONTROL METHOD

CROSS REFERENCE TO RELATED APPLICATIONS

This application claims the priority benefit of Japanese Patent Application No. 2016-232652, filed on Nov. 30, 2016. The entirety of the above-mentioned patent application is hereby incorporated by reference herein and made a part of this specification.

TECHNICAL FIELD

This disclosure relates to a non-transitory computer readable medium stored with a printing control program, a printing control device, and a printing control method for use in prompting an inkjet printer to carry out a printing operation.

DESCRIPTION OF THE BACKGROUND ART

In some known methods for obtaining three-dimensional objects using 3D inkjet printers, object-shaping data processable by the 3D printers is generated based on 3D model data, and the three-dimensional objects are formed by the 3D inkjet printers based on the object-shaping data (for example, Japanese Unexamined Patent Publication No. 2015-193184).

SUMMARY

In the known art, however, once a three-dimensional object starts to be formed, the 3D printer is not allowed to start to form another three-dimensional object over extended time until the ongoing printing operation is over.

To address the issue of the known art, this disclosure is directed to providing a non-transitory computer readable medium stored with a printing control program, a printing control device, and a printing control method that may reduce a length of time after a printing job is commenced and before another printing job starts to be executed in an inkjet printer.

A non-transitory computer readable medium according to one aspect of this disclosure is stored with a printing control program configured to run on a computer to implement a printing controller that prompts an inkjet printer to perform a printing operation, and an interrupt time storing unit that stores an interrupt time of a printing job executed by the inkjet printer when the printing job is interrupted by the printing controller. The printing controller restarts the printing job at the interrupt time stored by the interrupt time storing unit. The printing controller prompts the inkjet printer to execute another printing job after the printing job is interrupted and before the printing job interrupted is restarted.

By running the printing control program on the computer, the computer that interrupted a printing job executed by the inkjet printer may allow the inkjet printer to execute another printing job before the interrupted printing job is restarted. This may reduce a length of time after a printing job is commenced and before another printing job starts to be executed in the inkjet printer.

A printing control device according to one aspect of this disclosure includes a printing controller that prompts an inkjet printer to perform a printing operation, and an interrupt time storing unit that stores an interrupt time of a printing job executed by the inkjet printer when the printing job is interrupted by the printing controller. The printing controller restarts the printing job at the interrupt time stored by the interrupt time storing unit. The printing controller prompts the inkjet printer to execute another printing job after the printing job is interrupted and before the printing job interrupted is restarted.

After a printing job executed by the inkjet printer is interrupted, the printing control device may allow the inkjet printer to execute another printing job before the interrupted printing job is restarted. This may reduce a length of time after a printing job is commenced and before another printing job starts to be executed in the inkjet printer.

A printing control method according to one aspect of this disclosure includes a printing control step of prompting an inkjet printer to perform a printing operation, and an interrupt time storing step of storing an interrupt time of a printing job executed by the inkjet printer when the printing job is interrupted by the printing controller. In the printing control step, the printing job is restarted at the interrupt time stored in the interrupt time storing step, and the inkjet printer is allowed to execute another printing job after the printing job is interrupted and before the printing job interrupted is restarted.

After a printing job executed by the inkjet printer is interrupted, the printing control method may allow the inkjet printer to execute another printing job before the interrupted printing job is restarted. This may reduce a length of time after a printing job is commenced and before another printing job starts to be executed in the inkjet printer.

A non-transitory computer readable medium according to another aspect of this disclosure is stored with a printing control program configured to run on a computer to implement a printing controller that prompts an inkjet printer to perform a printing operation, a display controller that displays a preview of a printing job executed by the inkjet printer on a display device, and a partial printing instruction receiver that receives an instruction to execute a part of the printing job via the preview displayed on the display device by the display controller. The printing controller prompts the inkjet printer to execute the part of the printing job when the instruction to execute the part is received by the partial printing instruction receiver.

By running the printing control program on the computer, the computer prompts the inkjet printer to execute a part of the printing job as instructed on the preview instead of the whole printing job. This may reduce a length of time after a printing job is commenced and before another printing job starts to be executed in the inkjet printer. By running the printing control program on the computer, an instruction on a part to be executed of the printing job is received via the preview. This may reduce any difference between an object that a user intends to print using the inkjet printer and an object actually printed by the inkjet printer.

A printing control device according to another aspect of this disclosure includes a printing controller that prompts an inkjet printer to perform a printing operation, a display controller that displays a preview of a printing job executed by the inkjet printer on a display device, and a partial printing instruction receiver that receives an instruction to execute a part of the printing job via the preview displayed on the display device by the display controller. The printing controller prompts the inkjet printer to execute the part of the printing job when the instruction to execute the part is received by the partial printing instruction receiver.

The printing control device prompts the inkjet printer to execute a part of the printing job as instructed on the preview instead of the whole printing job. This may reduce a length of time after a printing job is commenced and before another printing job starts to be executed in the inkjet printer. The printing control device allows the inkjet printer to receive an instruction on a part to be executed of the printing job via the preview. This may reduce any difference between an object that a user intends to print using the inkjet printer and an object actually printed by the inkjet printer.

A printing control method according to another aspect of this disclosure includes a printing control step of prompting an inkjet printer to perform a printing operation, a display control step of displaying a preview of a printing job executed by the inkjet printer on a display device, and a partial printing instruction receiving step of receiving an instruction to execute a part of the printing job via the preview displayed on the display device in the display control step. In the printing control step, the inkjet printer is prompted to execute the part of the printing job when the instruction to execute the part is received in the partial printing instruction receiving step.

In the printing control method, the inkjet printer is prompted to execute a part of the printing job as instructed on the preview instead of the whole printing job. This may reduce a length of time after a printing job is commenced and before another printing job starts to be executed in the inkjet printer. In the printing control method, an instruction on a part to be executed of the printing job is received via the preview. This may reduce any difference between an object that a user intends to print using the inkjet printer and an object actually printed by the inkjet printer.

In the non-transitory computer readable medium according to the one aspect, the printing control program may be configured to run on the computer to further implement a display controller that displays a preview of the printing job executed by the inkjet printer on a display device, and a partial printing instruction receiver that receives an instruction to execute a part of the printing job via the preview displayed on the display device by the display controller. The printing controller may interrupt the printing job by prompting the inkjet printer to execute the part of the printing job when the instruction to execute the part is received by the partial printing instruction receiver.

By running the printing control program on the computer, the computer prompts the inkjet printer to execute a part of the printing job as instructed on the preview instead of the whole printing job. This may reduce a length of time after a printing job is commenced and before another printing job starts to be executed in the inkjet printer. By running the printing control program on the computer, an instruction on a part to be executed of the printing job before the interrupt is received via the preview. This may reduce any difference between an object that a user intends to print using the inkjet printer and an object actually printed by the inkjet printer in both of a part of the printing job executed before the interrupt and a part of the printing job executed after the restart.

In the non-transitory computer readable medium according to the one aspect, in the printing control program, the inkjet printer may be a 3D printer that forms a three-dimensional object by printing, the printing control program may be configured to run on the computer to further implement an object-shaping data generator that generates object-shaping data processable by the 3D printer from 3D model data, and a part-adding instruction receiver that receives an instruction on whether to add a part with a specified thickness to a surface of the three-dimensional object, the printing controller may prompt the 3D printer to form the three-dimensional object based on the object-shaping data generated by the object-shaping data generator, and the object-shaping data generator may generate the object-shaping data to which the part is added when an instruction to add the part is received by the part-adding instruction receiver.

By running the printing control program on the computer, the computer generates the object-shaping data in which a part with a specified thickness has been added to the surface of a three-dimensional object. This may allow the 3D printer to form a three-dimensional object having the part added to its surface. Conventionally, a three-dimensional object formed by a 3D printer with a plurality of ink droplets may have irregularities on its surface. In a three-dimensional object formed as prompted by the computer on which the printing control program is run, such irregularities may be reduced by cutting off the part added to the object's surface.

In the non-transitory computer readable medium according to the one aspect, in the printing control program, the part may be formed from an ink identical to an ink used to form a surface layer of the three-dimensional object in the object-shaping data assumed to be formed based on the 3D model data without adding the part.

By running the printing control program on the computer, the computer prompts the 3D printer to form the part to be added to the surface of the three-dimensional object using the same ink as in the surface layer of a three-dimensional object in the object-shaping data assumed to be generated from the 3D model data without adding the part. This may allow the 3D printer 20 to form a three-dimensional object having its surface layer increased in thickness based on the object-shaping data assumed to be generated from the 3D model data without adding the part. By running the printing control program on the computer, therefore, the three-dimensional object formed by the 3D printer as prompted by the computer may have an external appearance suitably corresponding to the 3D model data after the part added to the object's surface is cut off.

In the non-transitory computer readable medium according to the one aspect, in the printing control program, the part-adding instruction receiver may receive an instruction on the specified thickness.

By running the printing control program on the computer, the 3D printer prompted by the computer may form a three-dimensional object to which a part with an optional thickness desired by a user has been added. Conventionally, a three-dimensional object formed by a 3D printer with a plurality of ink droplets may have irregularities on its surface. In a three-dimensional object formed as prompted by the computer on which the printing control program is run, such irregularities may be reduced by cutting off the part added to the object's surface

EFFECTS OF THE INVENTION

The non-transitory computer readable medium stored with the printing control program, printing control device, and printing control method disclosed herein may reduce a length of time after a printing job is commenced and before another printing job starts to be executed in an inkjet printer.

DETAILED DESCRIPTION OF EMBODIMENTS

An embodiment of this disclosure is hereinafter described in detail with reference to the accompanying drawings.

First, a three-dimensional object manufacturing system according to this embodiment is described.

Figure 1:
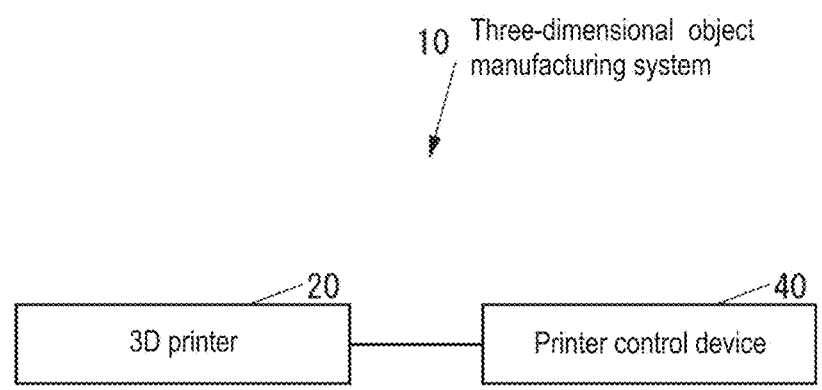
FIG. 1 is a block diagram of a three-dimensional object manufacturing system according to an embodiment of this disclosure.

FIG. 1 is a block diagram of a three-dimensional object manufacturing system 10 according to an embodiment of this disclosure.

As illustrated in FIG. 1, the three-dimensional object manufacturing system 10 is equipped with a 3D printer 20 that forms a three-dimensional object by printing using inks, and a printer control device 40 that controls the 3D printer 20. The printer control device 40 generates object-shaping data processable by the 3D printer 20 in such a data format as OBJ, 3MF, or STL based on 3D model data.

Figure 2:
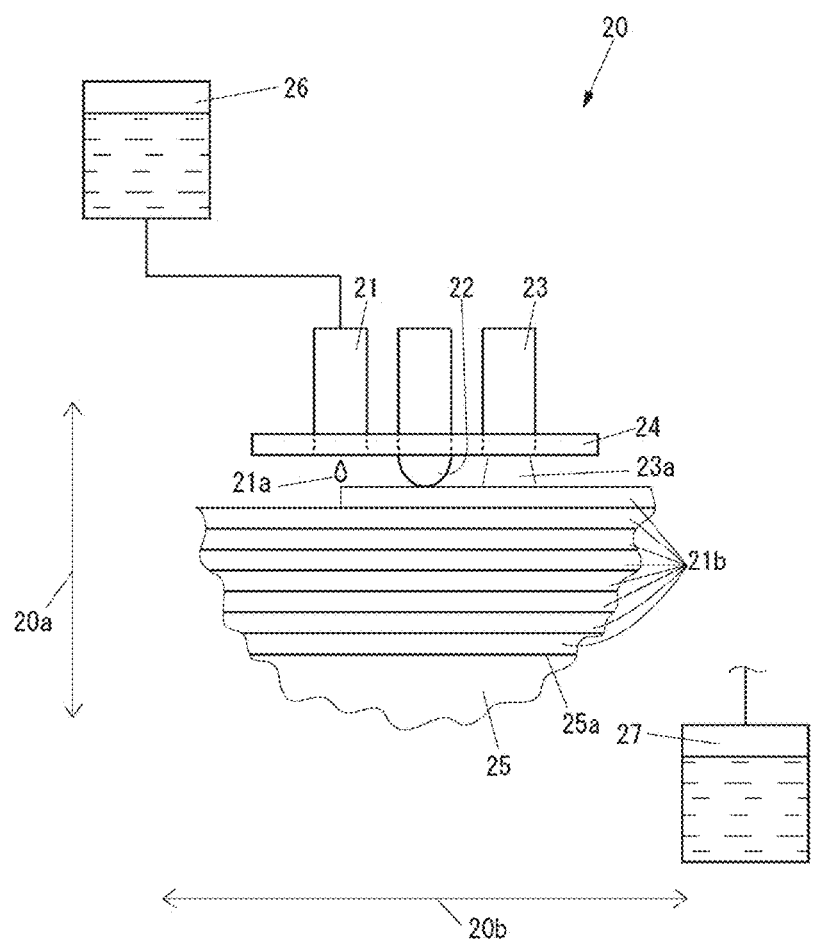
FIG. 2 is a front view of a 3D printer illustrated in FIG. 1.

FIG. 2 is a front view of the 3D printer 20 illustrated in FIG. 1.

As illustrated in FIG. 2, the 3D printer 20 has a carriage 24 mounted with a plurality of inkjet heads 21, a flattening roller 22, and ultraviolet irradiators 23. The inkjet heads 21 eject ultraviolet-curable inks (hereinafter, UV inks) 21a downward in a vertical direction 20a. The flattening roller 22 makes contact with and flattens layers 21b of the UV inks 21a ejected from the inkjet heads 21. The ultraviolet irradiators 23 irradiate the layers 21b of the UV inks 21a with ultraviolet light 23a.

Though only one inkjet head 21 is illustrated in FIG. 2, the 3D printer 20 has plural inkjet heads 21 each for a respective one of the UV inks 21a.

The UV inks 21a may include inks for object shaping used to form a three-dimensional object, and a support ink used to form a support portion. The support portion supports the three-dimensional object to allow the object to be formed in an optional shape.

The inks for object shaping may include a white modeling ink used to form the base of the three-dimensional object, color inks applied onto the modeling ink on the three-dimensional object to decorate the object's surface portion, and a clear ink applied onto the modeling ink and the color inks on the three-dimensional object to decorate the object's surface portion. Examples of the color inks may include cyan ink, magenta ink, yellow ink, and black ink.

The support ink may be an ink that is easily removable with a liquid such as water. In the three-dimensional object, the support portion may be formed by the 3D printer 20 horizontally or on the lower side in the vertical direction 20a. In case the three-dimensional object has an overhanging portion, the support portion is formed on the lower side in the vertical direction 20a than the overhang portion so as to support the overhanging portion.

The 3D printer 20 has a table 25 with a support surface 25a. The support surface 25a supports the support portion and the three-dimensional object while being formed from the UV inks 21a ejected from the inkjet heads 21 and cured by the ultraviolet light 23a radiated from the ultraviolet irradiators 23. The support surface 25a extends in the horizontal direction orthogonal to the vertical direction 20a.

One of the carriage 24 and the table 25 is movable relative to the other in the horizontal direction.

The carriage 24 may be supported by a mechanism, not illustrated in the drawings, movable in a main scanning direction 20b; one of directions included in the horizontal direction. The carriage 24 thus supported is allowed to move in the main scanning direction 20b relative to the table 25. In the description below, the carriage 24 moves in the main scanning direction 20b relative to the table 25. Instead, the table 25 may be moved in the main scanning direction 20b relative to the carriage 24, or the carriage 24 and the table 25 may both be moved in the main scanning direction 20b to allow one of the carriage 24 and the table 25 to move relative to the other in the main scanning direction 20b.

The carriage 24 may be supported by a mechanism, not illustrated in the drawings, movable in a sub scanning direction orthogonal to the main scanning direction 20b included in the horizontal direction. The carriage 24 thus supported is allowed to move in the sub scanning direction relative to the table 25. In the description below, the carriage 24 moves in the sub scanning direction relative to the table 25. Instead, the table 25 may be moved in the sub scanning direction relative to the carriage 24, or the carriage 24 and the table 25 may both be moved in the sub scanning direction to allow one of the carriage 24 and the table 25 to move relative to the other in the sub scanning direction.

One of the carriage 24 and the table 25 is movable relative to the other in the vertical direction 20a For example, the table 25 may be supported by a mechanism, not illustrated in the drawings, movable in the vertical direction 20a. The table 25 thus supported is allowed to move in the vertical direction 20a relative to the carriage 24. In the description below, the table 25 moves in the vertical direction 20a relative to the carriage 24. Instead, the carriage 24 may be moved in the vertical direction 20a relative to the table 25, or the carriage 24 and the table 25 may both be moved in the vertical direction 20a to allow one of the carriage 24 and the table 25 to move relative to the other in the vertical direction 20a.

The 3D printer 20 includes an ink tank 26, and a waste ink tank 27. The ink tank 26 is the storage of the UV inks 21a supplied to the inkjet heads 21. The waste ink tank 27 is the storage of the waste UV inks 21a removed to form (print) the object, for example, the UV inks 21a scraped off the layers 21b by the flattening roller 22 to flatten the layers 21b formed from the modeling ink and the support ink, and the UV inks 21a ejected from the inkjet heads 21 during maintenance.

Though only one ink tank 26 is illustrated in FIG. 2, the 3D printer 20 has plural ink tanks 26 each for a respective one of the UV inks 21a.

Figure 3:
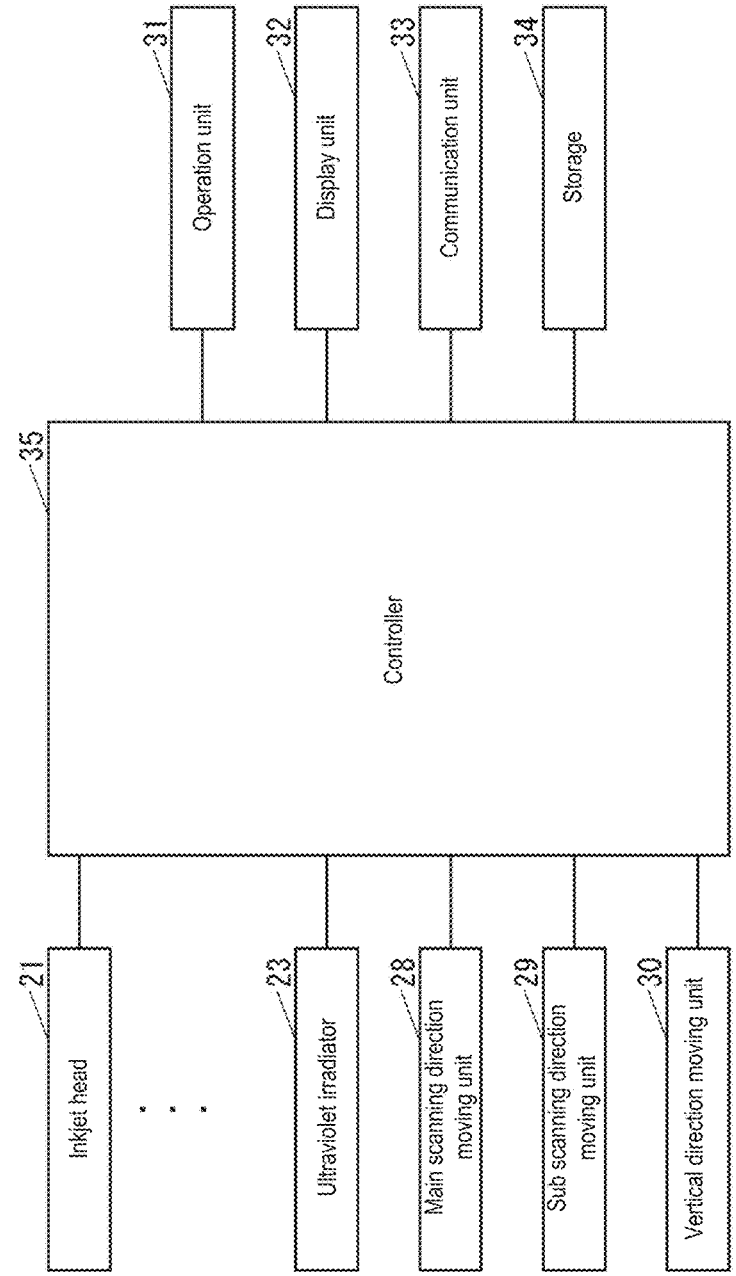
FIG. 3 is a block diagram of the 3D printer illustrated in FIG. 1.

FIG. 3 is a block diagram of the 3D printer 20.

As illustrated in FIG. 3, the 3D printer 20 has a main scanning direction moving unit 28, a sub scanning direction moving unit 29, a vertical direction moving unit 30, and an operation unit 31, a display unit 32, a communication unit 33, a storage 34, and a controller 35. The main scanning direction moving unit 28 moves the carriage 24 (see FIG. 2) in the main scanning direction 20b (see FIG. 2). The sub scanning direction moving unit 29 moves the carriage 24 in the sub scanning direction. The vertical direction moving unit 30 moves the table 25 (see FIG. 2) in the vertical direction 20a (see FIG. 2). The operation unit 31 is an input device including buttons manipulated to input various instructions. The display unit 32 is, for example, LCD (liquid crystal display) on which various pieces of information are displayable. The communication unit 33 is used to communicate with an external apparatus(es) wirelessly or by wire directly without the intervention of a network such as LAN (local network) or indirectly through such a network. The storage 34 is a non-volatile storage in which various pieces of information are storable, such as a semiconductor memory and HDD (hard disc device). The controller 35 controls the whole 3D printer 20.

The controller 35 may include CPU (central processing unit), ROM (read-only memory) in which programs and various pieces of data are stored beforehand, and RAM (random access memory) used as the CPU's working space. The CPU is operable to execute the programs stored in the ROM or the storage 34.

Based on the object-shaping data received from the printer control device 40 (see FIG. 1) via the communication unit 33, the controller 35 controls the operations of the inkjet heads 21, ultraviolet irradiators 23, main scanning direction moving unit 28, sub scanning direction moving unit 29, and vertical direction moving unit 30. Specifically, for each position change of the carriage 24 relative to the table 25 in the sub scanning direction by the sub scanning direction moving unit 29, the controller 35, while moving the carriage 24 in the main scanning direction 20b using the main scanning direction moving unit 28, prompts the inkjet heads 21 and the ultraviolet irradiators 23 to eject and dry the object-shaping ink and the support ink to form the layer 21b extending in the horizontal direction. For each position change of the table 25 relative to the carriage 24 in the vertical direction 20a by the vertical direction moving unit 30, the controller 35, by repeatedly prompting the inkjet heads 21 and the ultraviolet irradiators 23 to eject and dry the object-shaping ink and the support ink, accumulates the horizontally extending layers 21b in the vertical direction 20a to form the three-dimensional object and the support portion on the table 25.

Figure 4:
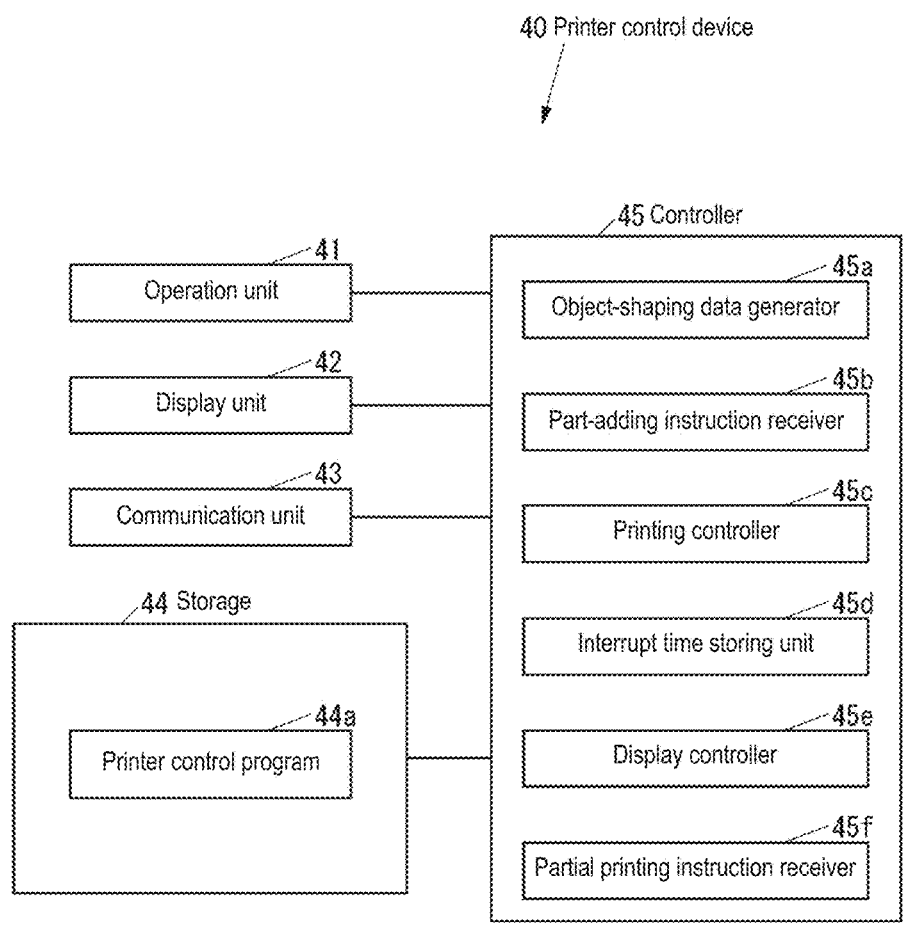
FIG. 4 is a block diagram of a printer control device illustrated in FIG. 1.

FIG. 4 is a block diagram of the printer control device 40.

As illustrated in FIG. 4, the printer control device 40 includes an operation unit 41, a display unit 42, a communication unit 43, a storage 44, and a controller 45. The operation unit 41 is an input device including a keyboard and a mouse manipulated to input various instructions. The display unit 42 is, for example, LCD (liquid crystal display) on which various pieces of information are displayable. The communication unit 43 is used to communicate with an external apparatus(es) wirelessly or by wire directly without the intervention of a network such as LAN or indirectly through such a network. The storage 44 is a non-volatile storage in which various pieces of information are storable, such as a semiconductor memory and HDD. The controller 45 controls the whole printer control device 40. The printer control device 40 includes, for example, a computer such as PC (personal computer).

In the storage 44 is stored a printer control program 44a for controlling the 3D printer 20 (see FIG. 3). The printer control program 44a may be installed in the printer control device 40 during the manufacture of this device, or may be later installed in the printer control device 40 through a network or from an external storage medium such as USB (universal serial bus) memory, CD (compact disk), or DVD (digital versatile disk).

The controller 45 may include CPU, ROM in which programs and various pieces of data are previously stored, and RAM used as the CPU's working space. The CPU is operable to execute the programs stored in the ROM or the storage 44.

The printer control program 44a is configured to run on the controller 45 to implement an object-shaping data generator 45a, a part-adding instruction receiver 45b, a printing controller 45c, an interrupt time storing unit 45d, a display controller 45e, and a partial printing instruction receiver 45f. The object-shaping data generator 45a generates object-shaping data processable by the 3D printer 20 based on the 3D model data. The part-adding instruction receiver 45b receives an instruction on whether to add a part with a specified thickness to the surface of a three-dimensional object. The printing controller 45c prompts the 3D printer 20 to carry out the printing operation to form the three-dimensional object. The interrupt time storing unit 45d stores an interrupt time when a printing job executed by the 3D printer 20 is interrupted by the printing controller 45c. The display controller 45e displays the preview of a printing job executed by the 3D printer 20 on the display unit 42. The partial printing instruction receiver 45f receives an instruction to execute a part of the printing job via the preview displayed on the display unit 42 by the display controller 45e. The printer control device 40 is an example of the claimed printing control device, the printer control program 44a is an example of the claimed printing control program.

Next, the operation of the printer control device 40 is described.

Figure 5:
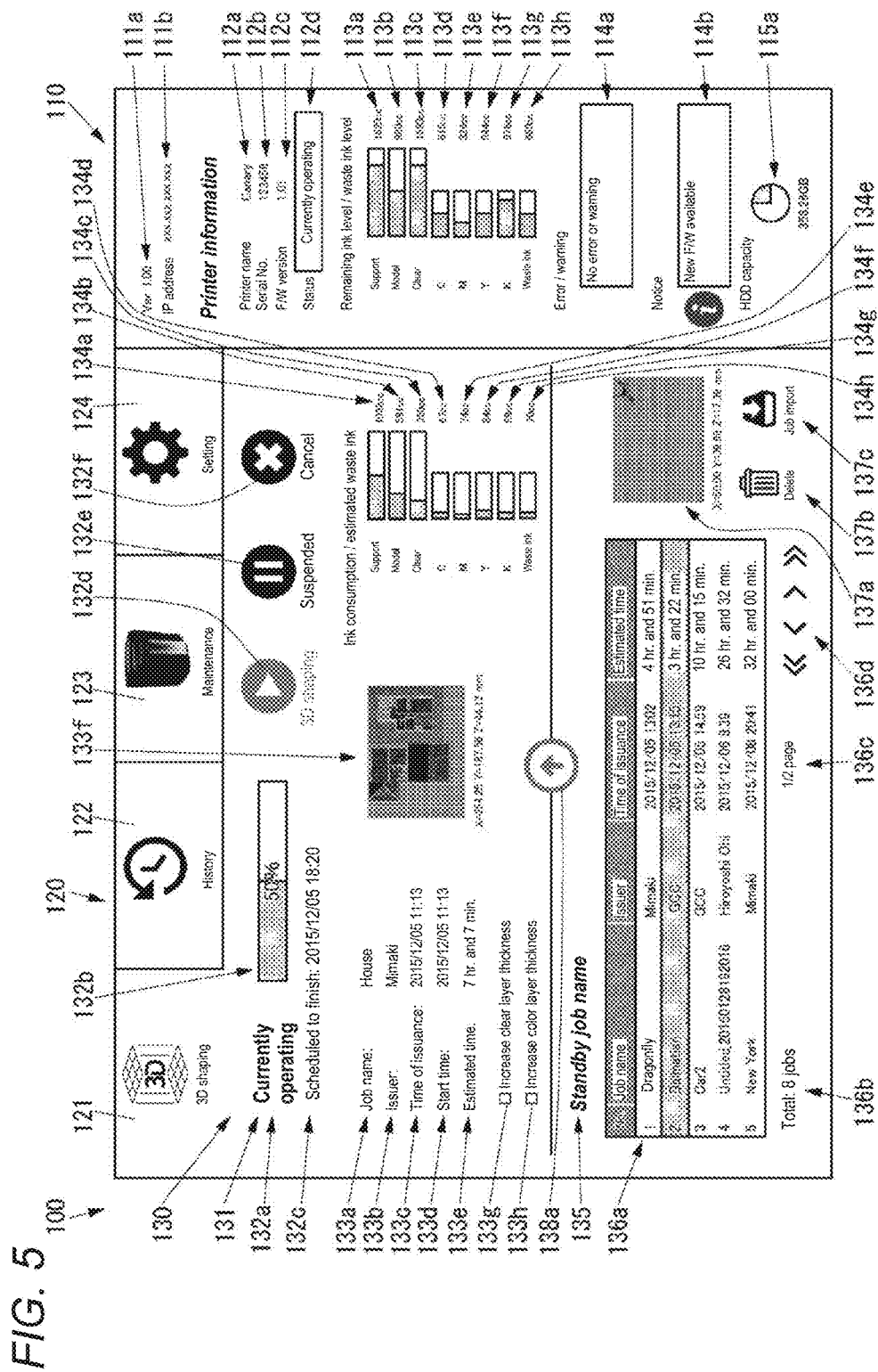
FIG. 5 is a drawing of a graphical user interface displayed on a display unit illustrated in FIG. 4.

FIG. 5 is a drawing of a graphical user interface (hereinafter, "GUI") 100 displayed on the display unit 42.

When the printer control device 40 is turned on, the display controller 45e displays the GUI 100 illustrated in FIG. 5 on the display unit 42.

As illustrated in FIG. 5, the GUI 100 includes a regular display region 110 on which information on the 3D printer 20 and information on the printer control device 40 are always displayable, and a display changeable region 120 on which an indication to be displayed is changeable by clicking one of tabs.

The regular display region 110 includes an application version display region 111a on which the version of the printer control program 44a is displayable, and an IP (Internet protocol) address display region 111b on which the address of the printer control device 40 is displayable.

The regular display region 110 includes a printer name display region 112a, a serial number display region 112b, an FW version display region 112c, and a status display region 112d. The name of the 3D printer 20 is displayable on the printer name display region 112a. The serial number of the 3D printer 20 is displayable on the serial number display region 112b. The firmware version of the 3D printer 20 is displayable on the FW version display region 112c. One of statuses of the 3D printer 20, "currently operating", "standby", and "printing disabled", is displayable on the status display region 112d.

The regular display region 110 includes a support ink level display region 113a on which the quantity of the support ink currently stored in the ink tank 26. i.e., the residual quantity of the support ink in the ink tank 26, is graphically and numerically displayable. The regular display region 110 further includes display regions for the ink levels of the white modeling ink, clear ink, cyan ink, magenta ink, yellow ink, and black ink. These display regions are a modeling ink level display region 113b, a clear ink level display region 113c, a cyan ink level display region 113d, a magenta ink level display region 113e, a yellow ink level display region 113f, and a black ink level display region 113g. The regular display region 110 includes a waste ink level display region 113h on which the level of the UV inks 21a stored in the waste ink tank 27 is displayable.

In the graph of the support ink level display region 113a, a rectangular shape indicates the largest capacity of the support ink tank 26, and a shaded part of the rectangular shape on its left side indicates the current level of the support ink in the support ink tank 26. The same applies to the modeling ink level display region 113b, clear ink level display region 113c, cyan ink level display region 113d, magenta ink level display region 113e, yellow ink level display region 113f, black ink level display region 113g, and waste ink level display region 113h.

When the support ink remaining in the support ink tank 26 falls below a certain level, the support ink level display region 113a is partly accentuated, for example, the character "support" indicating the support ink; one of the UV inks 21a to be displayed on the support ink level display region 113a, may be accentuated. The same applies to the modeling ink level display region 113b, clear ink level display region 113c, cyan ink level display region 113d, magenta ink level display region 113e, yellow ink level display region 113f, and black ink level display region 113g. On the other hand, the waste ink level display region 113h is partly accentuated when the level of the UV inks 21a in the waste ink tank 27 exceeds a certain level, for example, the character "waste ink" may accentuated.

The regular display region 110 includes an error/warning display region 114a on which an error and/or warning that most recently occurred is displayable, and a notice display region 114b that notifies a user of version-up information for upgrading firmware of the printer control program 44a or the 3D printer 20. When the version-up information is available, an icon is displayed on the notice display region 114b. When the icon is clicked, the display controller 45e displays a version-up screen on the display unit 42. On this screen, the firmware of the printer control program 44a or the 3D printer 20 can be upgraded.

The regular display region 110 includes an HDD capacity display region 115a on which a work folder's remaining capacity in the storage 44 is graphically displayable. The HDD capacity display region 115a is partly accentuated, for example, the graph is displayed in a different color, when the work folder's remaining capacity in the storage 44 falls below a certain value.

The display changeable region 120 has an object-shaping tab 121, a history tab 122, a maintenance tab 123, and a setting tab 124. The object-shaping tab 121 is clicked to display a job display region 130 on the display changeable region 120. On the job display region 130 are displayable a job to be currently processed of the 3D printer 20 (hereinafter, "current target job") and a printing job waiting to be processed by the 3D printer 20 (hereinafter, "standby job"). The history tab 122 is clicked to display a history display region 140 (see FIG. 8), described later, on the display changeable region 120. On the history display region 140 is displayable the history of an object-shaping result. The maintenance tab 123 is clicked to display a maintenance-related information display region on the display changeable region 120. On the maintenance-related information display region is displayable maintenance-related information of the 3D printer 20. The setting tab 124 is clicked to display a setting display region on the display changeable region 120. On the setting display region are displayable various items to be set such as language setting for the GUI 100 and network setting for the printer control device 40.

In this description, the maintenance-related information display region and the setting display region will be described in no further detail.

The job display region 130 includes a current target job display region 131 on which a current target job is displayable, and a standby job display region 135 on which a standby job is displayable.

The current target job display region 131 includes a status display region 132a, a progress display region 132b, and a scheduled finish time display region 132c. One of statuses, "ongoing", "standby", and "suspended", of the current target job is displayable on the status display region 132a. A progress bar indicating the current target job's progress (%) is displayable on the progress display region 132b. The scheduled finish time of a current target job is displayable on the scheduled finish time display region 132c. The display controller 45e is operable to calculate an estimated time required to execute a current target job (hereinafter, object-shaping estimated time) based on the 3D model data of the current target job. The display controller 45e is further operable to calculate a scheduled finish time of the current target job by adding the object-shaping estimated time of a current target job to a start time of the current target job.

The current target job display region 131 includes a start button 132d manipulated to start to execute a current target job, a suspend button 132e manipulated to suspend the current target job, and a cancel button 132f manipulated to cancel the current target job. When the start button 132d is manipulated, the object-shaping data generated based on the 3D model data of a current target job is transmitted to the 3D printer 20. When there is no job currently processed or the status of the current target job is "ongoing", the start button 132d is grayed out and inactive. The suspend button 132e is always grayed out unless the status of the current target job is "ongoing". The cancel button 132f is always grayed out unless the status of the current target job is "suspended". Once the cancel button 132f is manipulated, the current target job is no longer a job to be currently processed and is included in the history (i.e., to be included in a job history list display region 141a (see FIG. 8) described later).

The current target job display region 131 includes a job name display region 133a, an issuer display region 133b, an issuance time display region 133c, a start time display region 133d, an estimated time display region 133e, and a preview display region 133f. The name of a current target job is displayable on the job name display region 133a. The issuer of the current target job is displayable on the issuer display region 133b. The issuance time of the current target job is displayable on the issuance time display region 133c. The start time of the current target job is displayable on the start time display region 133d. An estimated time for the current target job to be completed is displayable on the estimated time display region 133e. The preview of the current target job is displayable on the preview display region 133f.

In FIG. 5, the preview display region 133f displays a preview of the three-dimensional object formed by the 3D printer 20 in a view from the upper side in the vertical direction 20a. A numerical value shown on the lower side of the preview on the preview display region 133f indicates the size of the three-dimensional object formed by the 3D printer 20. Symbols X, Y, and Z respectively indicate the sub scanning direction, main scanning direction 20b, and vertical direction 20a. The preview display region 133f in FIG. 5 displays a preview in a view from the upper to lower side in the vertical direction 20a. The preview displayed on this region may be a preview in a view from one side to the other in the horizontal direction.

Figure 6:
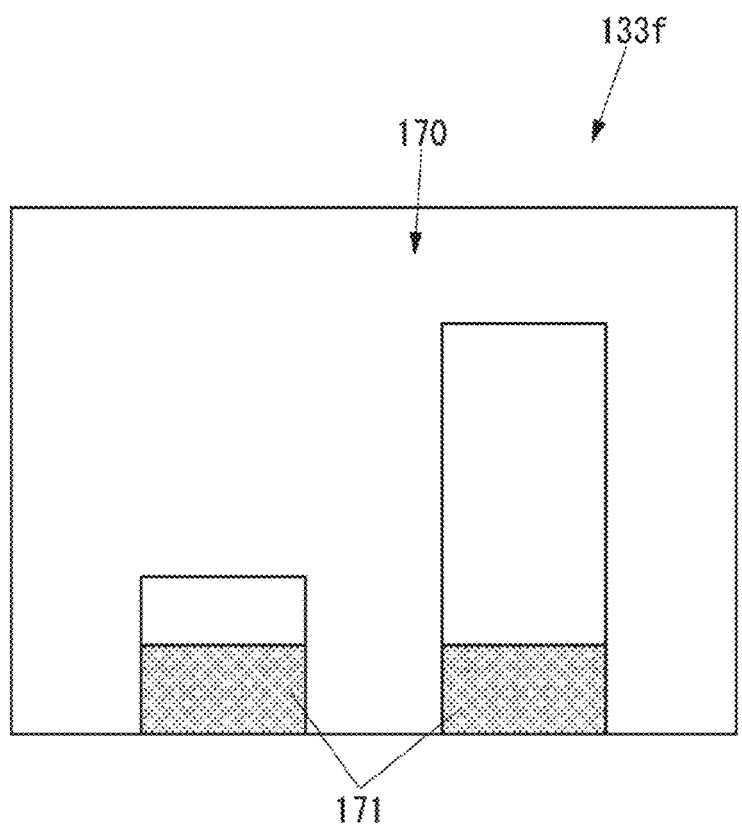
FIG. 6 is a drawing of a preview display region illustrated in FIG. 5.

In the preview displayed on the preview display region 133f, any completed parts of the object may be accentuated, for example, may be shaded or marked with red color. In FIG. 6, for example, the preview display region 133f displays a preview in a view from one side to the other in the horizontal direction, and completed parts 171 of a three-dimensional object 170 are shaded to be accentuated.

The current target job display region 131 includes a checkbox 133g and a checkbox 133h. The checkbox 133g is used to input an instruction on whether to increase the thickness of a clear layer formed from the clear ink in the three-dimensional object formed in the current target job. The checkbox 133h is used to input an instruction on whether to increase the thickness of a color layer formed from a color ink in the three-dimensional object formed in the current target job.

The current target job display region 131 includes a support ink estimated consumption display region 134a. On this region 134a, an estimated consumption of the support ink when the 3D printer 20 prints an object based on specific 3D model data is graphically and numerically displayable. The current target job display region 131 also includes display regions for the modeling, clear, cyan, magenta, yellow, and black inks. These display regions are a modeling ink estimated consumption display region 134b, a clear ink estimated consumption display region 134c, a cyan ink estimated consumption display region 134d, a magenta ink estimated consumption display region 134e, a yellow ink estimated consumption display region 134f, and a black ink estimated consumption display region 134g. The current target job display region 131 includes an estimated waste ink display region 134h. On this region 134h is displayable an estimate of the UV inks 21a collected in the waste ink tank 27 when the 3D printer 20 prints an object based on specific 3D model data.

In the graph of the support ink estimated consumption display region 134a, a rectangular shape indicates the largest capacity of the support ink tank 26, and a shaded part of the rectangular shape on its left side indicates an estimated consumption of the support ink from the support ink tank 26 when the 3D printer 20 prints an object based on specific 3D model data. The same applies to the modeling ink estimated consumption display region 134b, clear ink estimated consumption display region 134c, cyan ink estimated consumption display region 134d, magenta ink estimated consumption display region 134e, yellow ink estimated consumption display region 134f, and black ink estimated consumption display region 134g. In the graph of the estimated waste ink display region 134h, a rectangular shape indicates the largest capacity of the waste ink tank 27; storage of the waste UV inks 21a, and a shaded part of the rectangular shape on its left side indicates an estimate of the waste UV inks 21a in the waste ink tank 27 when the 3D printer 20 prints an object based on specific 3D model data.

Figure 7:
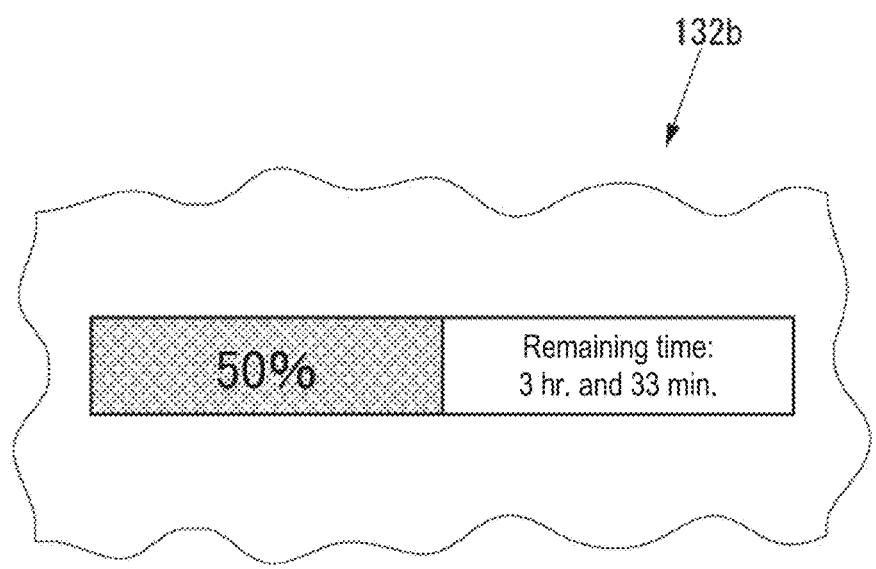
FIG. 7 is a drawing of a progress display region illustrated in FIG. 5.

The current target job display region 131 may display thereon remaining time required to finish the current target job. For example, remaining time required to finish the current target job may be displayed on the progress display region 132b, as illustrated in FIG. 7. The display controller 45e is operable to calculate a difference between a current time point and the scheduled finish time of the current target job as the remaining time required to finish the current target job.

The standby job display region 135 includes a standby job list display region 136a on which a list of standby jobs is displayable. In case the number of standby jobs is greater than the largest number of standby jobs in a list displayable on one page, all of the standby jobs can be displayed on the standby job list display region 136a by turning pages. By clicking the row of any one of the standby jobs displayed on the standby job list display region 136a, the clicked standby job can be selected. It is not possible to select multiple standby jobs at once on the standby job list display region 136a. Any one of the standby jobs displayed on the standby job list display region 136a is associated with 3D model data and object-shaping data of the standby job among all of the 3D model data and object-shaping data stored in the storage 44.

The standby job display region 135 includes a total number display region 136b, a page number display region 136c, and a page turn button 136d. The total number of standby jobs is displayable on the total number display region 136b. The page number of the list currently displayed on the standby job list display region 136a is displayable on the page number display region 136c. The page turn button 136d is manipulated to turn pages of the list displayed on the standby job list display region 136a. The page turn button 136d is grayed out and inactive when the number of standby jobs is less than or equal to the largest number of standby jobs in a list displayable on one page.

The standby job display region 135 includes a preview display region 137a, a delete button 137b, and a job import button 137c. The preview display region 135 is similar to the preview display region 133f, on which the preview of a standby job currently selected on the standby job list display region 136a is displayable. The delete button 137 is manipulated to delete a standby job currently selected on the standby job list display region 136a from the standby job list display region 136a. The job import button 137c is manipulated to add a printing job(s) stored in such an external storage medium as a USB memory, as a standby job(s), to the standby job list display region 136a.

In the preview displayed on the preview display region 137a, any completed parts of the object may be accentuated, for example, may be shaded or marked with red color, as with the preview display region 133f.

The standby job display region 135 includes a shift button 138a manipulated to shift the standby job currently selected on the standby job list display region 136a to the current target job. By manipulating the shift button 138a, the standby job is shifted to the current target job and deleted from the standby job list display region 136a.

Figure 8:
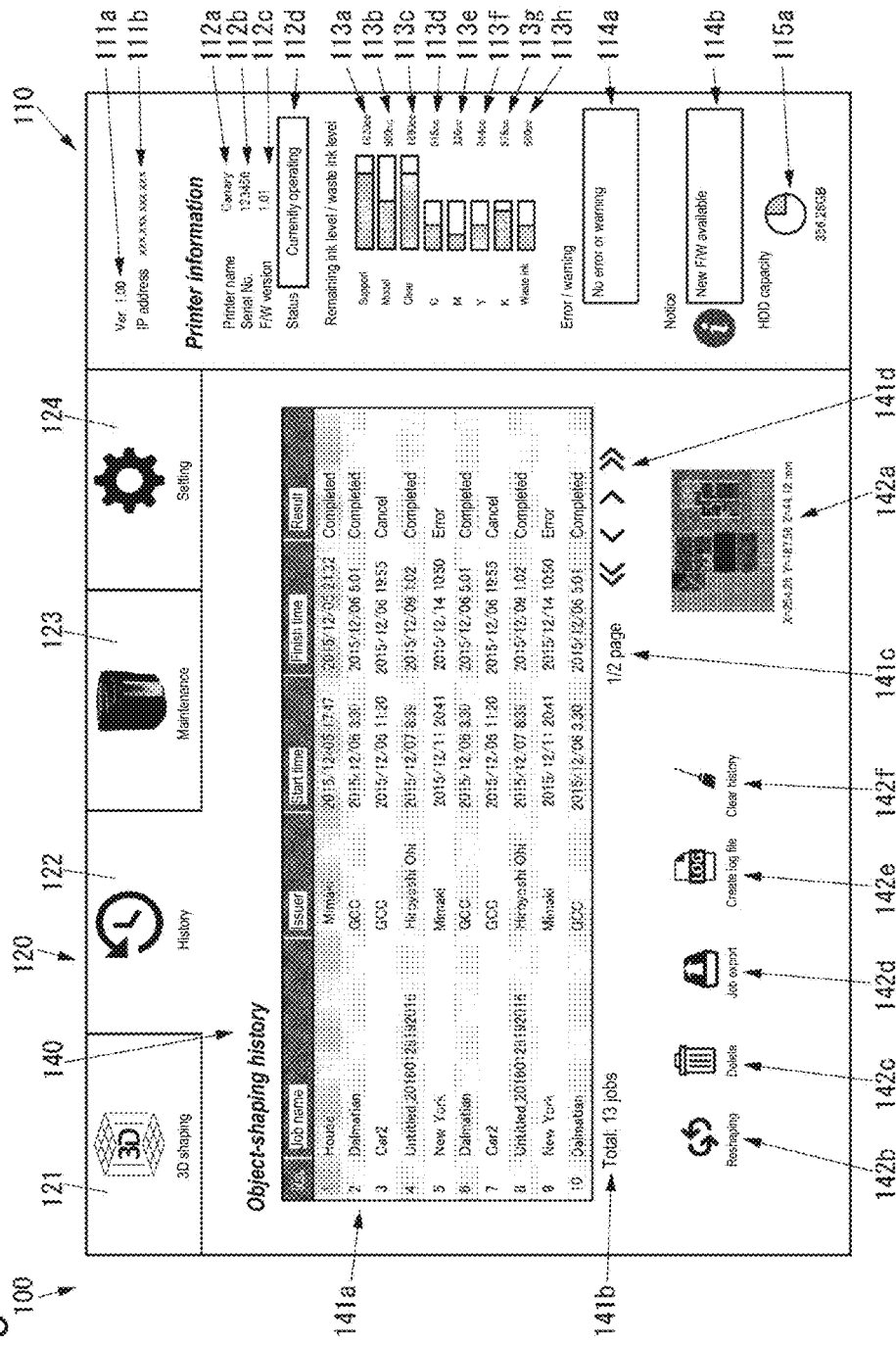
FIG. 8 is a drawing of an example of the graphical user interface illustrated in FIG. 5 when a history display region is displayed.

FIG. 8 is a drawing of an example of the graphical user interface (GUI) 100 when the history display region 140 is displayed.

As illustrated in FIG. 8, the history display region 140 includes a job history list display region 141*a* on which a list of printing jobs included in the history (hereinafter, "job history") is displayable. When any one of titles in leftmost columns is clicked on the job history list display region 141*a*, the job histories are sorted by the clicked title. On the job history list display region 141*a*, the sort is switched to and from an ascending sort and a descending sort for each click of the same title. By default, the job history list display region 141*a* displays thereon the printing jobs sorted in the ascending order by the title of "No.". In case the number of job histories is greater than the largest number of standby jobs in a list displayable on one page, all of the job histories can be displayed on the job history list display region 141*a* by turning pages. By clicking the row of any one of the job histories displayed on the job history list display region 141*a*, the clicked job history can be selected. It is not possible to select multiple job histories at once on the job history list display region 141*a*.

Any one of the job histories displayed on the job history list display region 141*a* is associated with 3D model data and object-shaping data of the job history among all of the 3D model data and object-shaping data stored in the storage 44.

Any job history with "completed" in the column of "result" on the job history list display region 141*a* is a printing job already executed and completed by the 3D printer 20. Any job history with "cancel" in the column of "result" on the job history list display region 141*a* is a printing job interrupted during the operation of the 3D printer 20, and its interrupt time is associated with the printing job.

The history display region 140 includes a total number display region 141*b*, a page number display region 141*c*, and a page turn button 141*d*. The total number of job histories is displayable on the total number display region 141*b*. The page number of the list currently displayed on the job history list display region 141*a* is displayable on the page number display region 141*c*. The page turn button 141*d* is manipulated to turn pages of the list displayed on the job history list display region 141*a*. The page turn button 141*d* is grayed out and inactive when the number of job histories is less than or equal to the largest number of job histories in a list displayable on one page.

The history display region 140 includes a preview display region 142*a* similar to the preview display region 133*f* (see FIG. 5). The preview of the job history currently selected on the job history list display region 141*a* is displayable on the preview display region 142*a*.

In the preview displayed on the preview display region 142*a*, any completed parts of the object may be accentuated, for example, may be shaded or marked with red color, as with the preview display region 133*f*.

The history display region 140 includes a reshaping button 142*b*, a delete button 142*c*, a job export button 142*d*, a log file creating button 142*e*, and a history clear button 142*f*. The reshaping button 142*b* is manipulated to set the job history currently selected on the job history list display region 141*a* as a standby job (i.e., to be included in the standby job list display region 136*a*). The delete button 142*c* is manipulated to delete the job history currently selected on the job history list display region 141*a* from this region, i.e., deleted from the history. The job export button 142*d* is manipulated to store the job history currently selected on the job history list display region 141*a* in an external storage medium such as a USB memory. The log file creating button 142*e* is manipulated to write job history information in a text file. The history clear button 142*f* is manipulated to delete all of the job histories from the history.

When the reshaping button 142*b* is manipulated, the job history currently selected on the job history list display region 141*a* is not deleted from this region.

When the log file creating button 142*e* is manipulated, the 3D model data and object-shaping data of the printing job included in the history are not written in the text file.

The operation of the printer control device 40 to form a three-dimensional object using the 3D printer 20 is hereinafter described.

Figure 9:
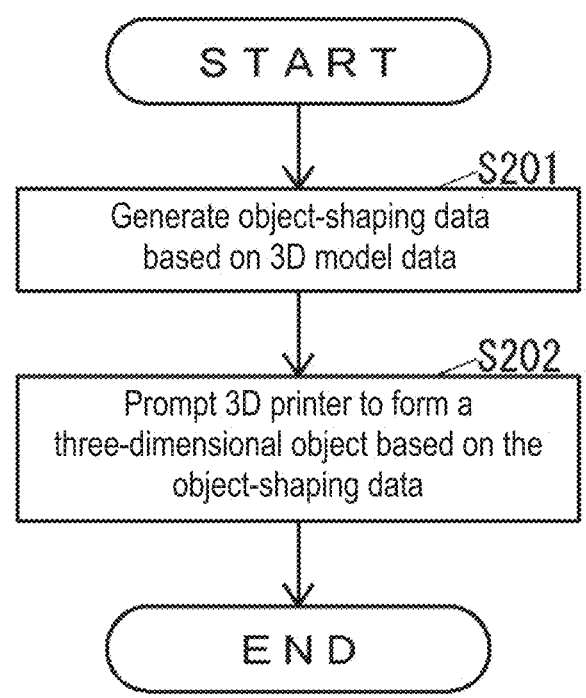
FIG. 9 is a flow chart of an operation of the printer control device illustrated in FIG. 4 to form a three-dimensional object using the 3D printer.

When the start button 132*d* is manipulated, the printer control device 40 carries out steps illustrated in FIG. 9.

FIG. 9 is a flow chart of the operation of the printer control device 40 to form a three-dimensional object using the 3D printer 20.

As illustrated in FIG. 9, the object-shaping data generator 45*a* generates the object-shaping data based on the 3D model data of the current target job (S201).

The printing controller 45*c* then prompts the 3D printer 20 to form a three-dimensional object based on the object-shaping data generated in Step S201 (S202). Then, the printer control device 40 ends the operation illustrated in FIG. 9.

The printer control device 40 may associate the object-shaping data generated for a printing job with the printing job and store this job-associated data in the storage 44. This may allow Step S201 to be skipped when the same printing job is executed more than once.

The operation of the printer control device 40 to generate the object-shaping data is described below.

Figure 10:
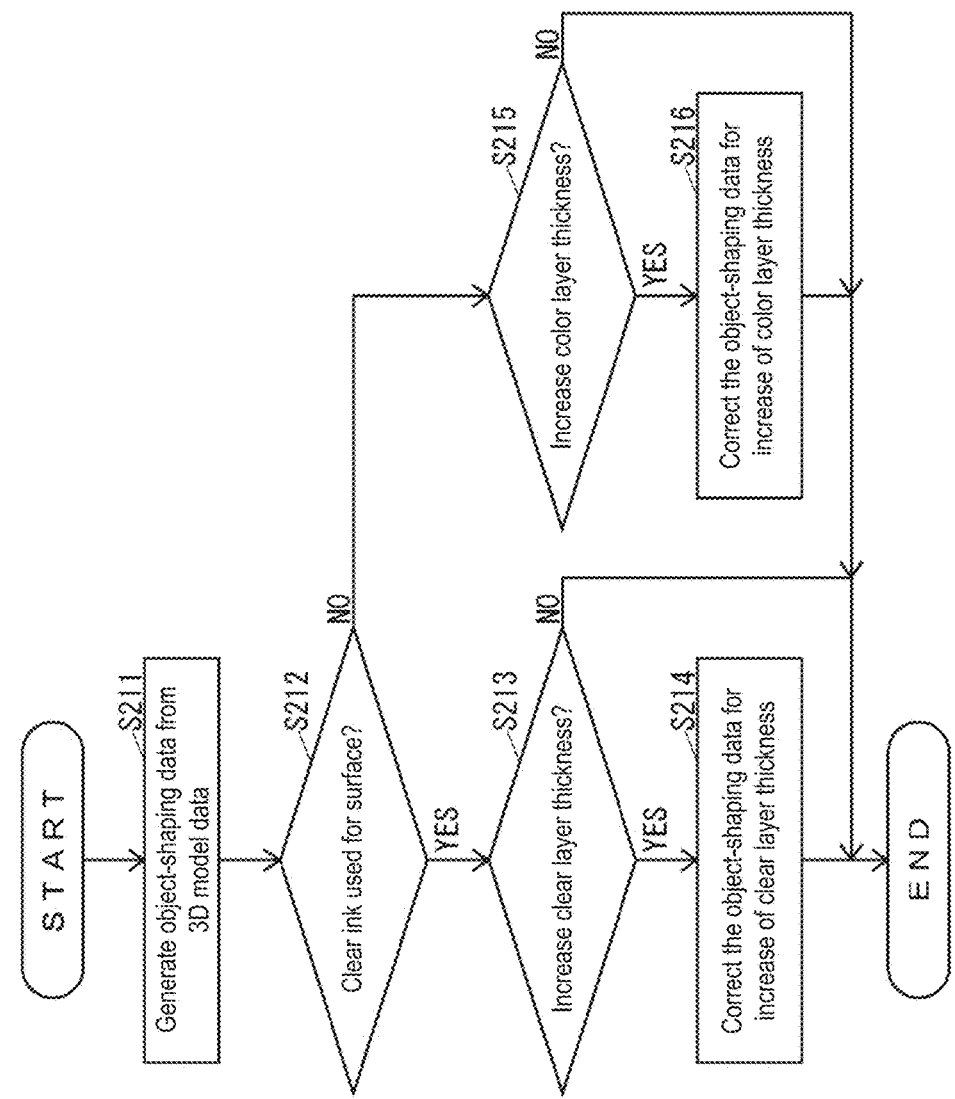
FIG. 10 is a flow chart of an operation of the printer control device illustrated in FIG. 4 to generate object-shaping data.

FIG. 10 is a flow chart of the operation of the printer control device 40 to form the object-shaping data.

As illustrated in FIG. 10, the object-shaping data generator 45*a* generates the object-shaping data from the 3D model data of the current target job (S211).

Then, the object-shaping data generator 45*a* determines whether the clear ink is the UV ink 21*a* used to form the surface layer of the three-dimensional object in the object-shaping data generated in Step S211 (S212).

When determined in Step S212 that the clear ink is the UV ink 21*a* used to form the surface layer of the three-dimensional object, the part-adding instruction receiver 45*b* determines whether an instruction to increase the clear layer in thickness has been received via the checkbox 133*g* (S213).

When determined in Step S213 that the instruction to increase the clear layer in thickness has been received, the object-shaping data generator 45*a* corrects the object-shaping data generated in Step S211 so as to have the clear layer alone increased in thickness on the surface of the three-dimensional object (S214).

When determined in Step S212 that the UV ink 21*a* used to form the surface layer of the three-dimensional object is not the clear ink but is a color ink, the part-adding instruction receiver 45*b* determines whether an instruction to increase the color layer in thickness has been received via the checkbox 133*h* (S215).

When determined in Step S215 that the instruction to increase the color layer in thickness has been received, the object-shaping data generator 45*a* corrects the object-shaping data generated in Step S211 so as to have the color layer alone increased in thickness on the surface of the three-dimensional object (S216).

The printer control device 40 ends the operation in FIG. 10 when Step S214 is done by the object-shaping data generator 45a or when determined in Step S213 that the instruction to increase the clear layer in thickness was not received, or when Step S216 is done by the object-shaping data generator 45a or when determined in Step S215 that the instruction to increase the color layer in thickness was not received.

The operation of the printer control device 40 when a printing job executed by the 3D printer 20 is interrupted.

Figure 11:
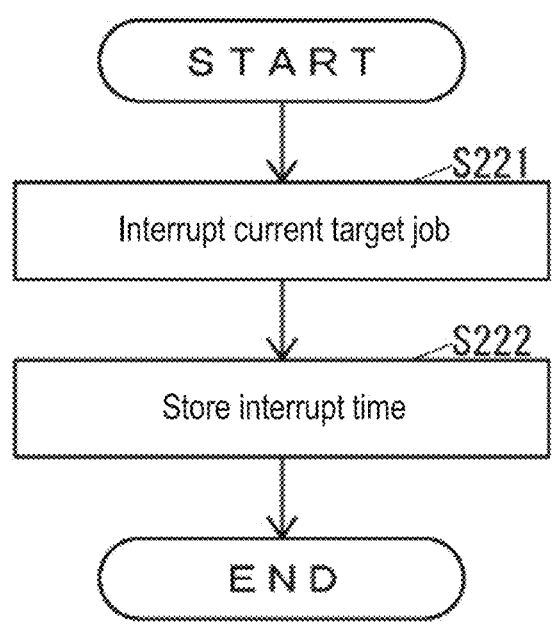
FIG. 11 is a flow chart of an operation of the printer control device illustrated in FIG. 4 when a printing job executed by the 3D printer is interrupted.

When the cancel button 132f is manipulated to interrupt a printing job executed by the 3D printer 20, the printer control device 40 carries out steps illustrated in FIG. 11.

FIG. 11 is a flow chart of the operation of the printer control device 40 to interrupt a printing job executed by the 3D printer 20.

As illustrated in FIG. 11, the printing controller 45c interrupts the current target job executed by the 3D printer 20 (S221).

The interrupt time storing unit 45d stores an interrupt time of the current target job associated with this job in the storage 44 (S222). Then, the printer control device 40 ends the operation illustrated in FIG. 11.

Hereinafter are described optional methods for interrupting the printing job currently executed by the 3D printer 20.

The printing job currently executed by the 3D printer 20 may be interrupted by manipulating the cancel button 132f. Instead, the printer control device 40 may prearrange interrupt of the printing job currently executed by the 3D printer 20.

Figure 12:
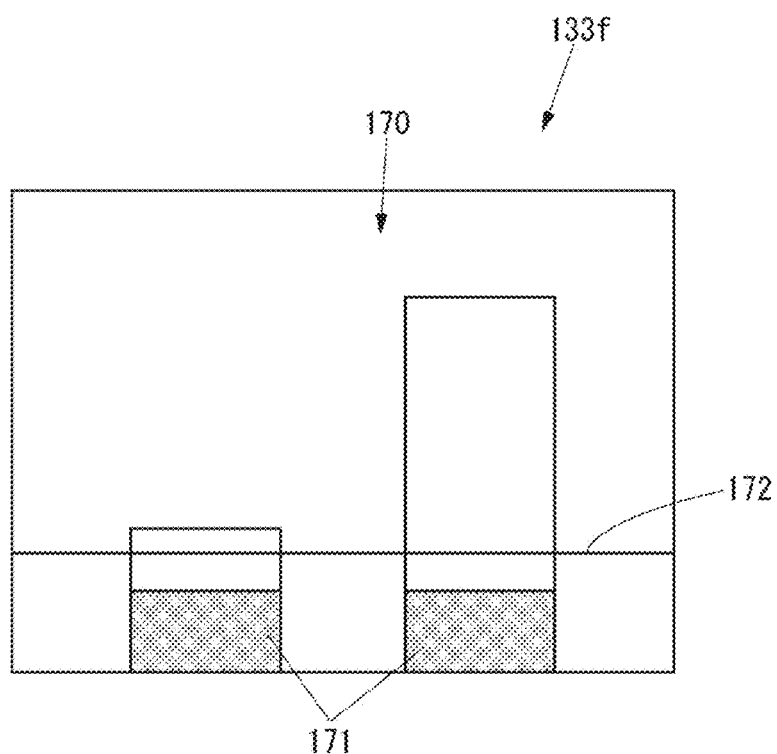
FIG. 12 is a drawing of an example of the preview display region illustrated in FIG. 5 that differs from FIG. 6.

When, for example, a preview in a view from one side in the horizontal direction is being displayed on the preview display region 133f as illustrated in FIG. 12, the partial printing instruction receiver 45f is allowed to receive, via the operation unit 41, an interrupt position 172 of a printing job executed by the 3D printer 20 to form the three-dimensional object 170. The printing controller 45c continues to execute the printing job of the three-dimensional object 170 until a position in the vertical direction 20a at which the three-dimensional object 170 is formed reaches the interrupt position 172. Once the position in the vertical direction 20a at which the three-dimensional object 170 is formed reaches the interrupt position 172, the printing controller 45c interrupts the printing job of the three-dimensional object 170.

Figure 13:
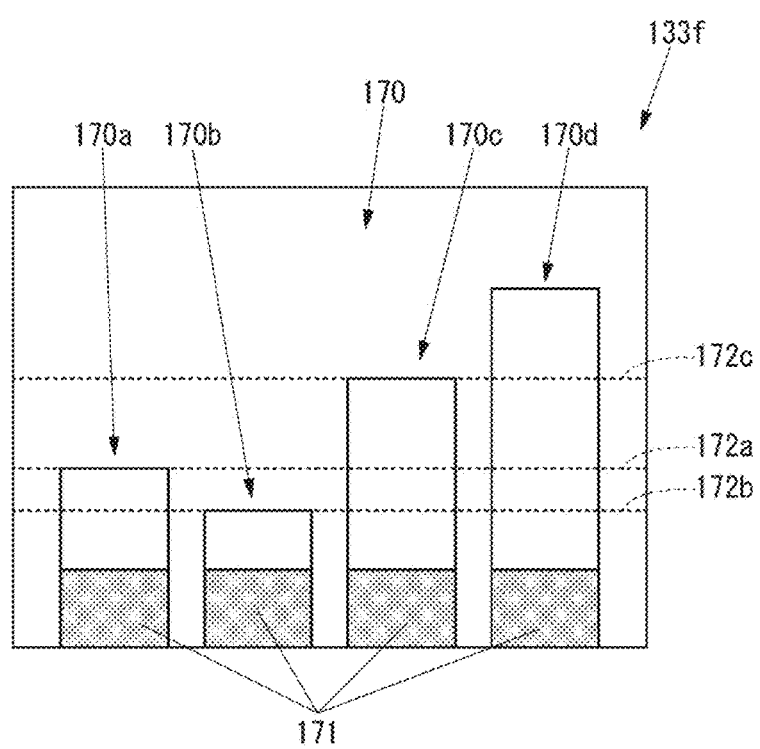
FIG. 13 is a drawing of an example of the preview display region illustrated in FIG. 5 that differs from FIGS. 6 and 12.

As the interrupt position 172, the partial printing instruction receiver 45f may set any optional position or a particular position on the preview. For example, information of the interrupt position selectable by a user on the preview may be included in the 3D model data. In case the three-dimensional object 170 includes a plurality of structural parts that differ in height in the vertical direction 20a (see FIG. 2), the partial printing instruction receiver 45f may set on the preview, as the interrupt position 172, a position at which any structural parts of the three-dimensional object but a highest structural part in the vertical direction 20a are completed. In case the three-dimensional object 170 includes a plurality of structural parts 170a to 170d that differ in height in the vertical direction 20a as illustrated in FIG. 13, the partial printing instruction receiver 45f may set on the preview, as the interrupt position 172, positions 172a to 172c at which the structural parts 170a to 170c, except the highest structural part 170d in the vertical direction 20a, are completed.

The partial printing instruction receiver 45f is allowed to set the interrupt position 172 on the preview before or after the current target job starts to be executed.

In case the printing job is interrupted by any means but by manipulating the cancel button 132f, the current target job is no longer a job to be currently processed and is included in the history (i.e., to be included in the job history list display region 141a (see FIG. 8)), as in the case of interrupting the printing job by manipulating the cancel button 132f.

The operation of the printer control device 40 when the printing job interrupted is restarted.

When a user selects a printing job with "cancel" in the column of "result" on the job history list display region 141a of the history display region 140 and manipulates the reshaping button 142b, the printer control device 40 includes the printing job in the standby job list display region 136a of the job display region 130. When the shift button 138a is manipulated, with the printing job being selected on the standby job list display region 136a, the printer control device 40 sets this printing job as the current target job. By manipulating the start button 132d with this printing job being selected as the current target job, the printer control device 40 carries out steps illustrated in FIG. 14.

Figure 14:
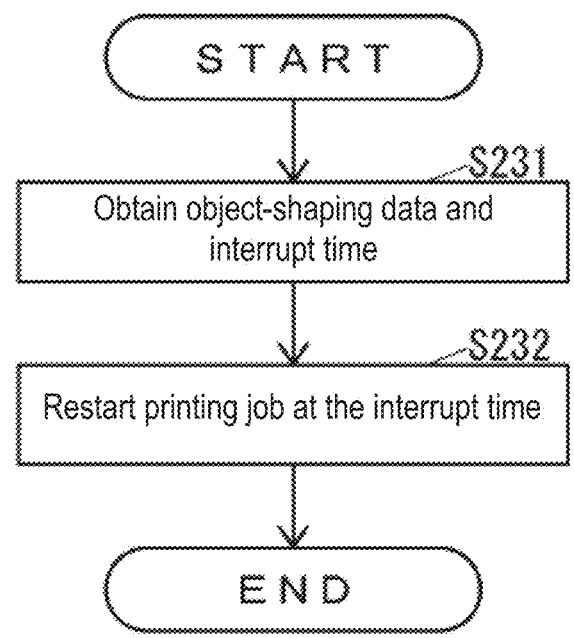
FIG. 14 is a flow chart of an operation of the printer control device illustrated in FIG. 4 when the interrupted printing job is restarted.

FIG. 14 is a flow chart of the operation of the printer control device 40 to restart the printing job interrupted.

As illustrated in FIG. 14, the printing controller 45c obtains the interrupt time and object-shaping data associated with the current target job and stored in the storage 44 (S231).

The printing controller 45c restarts the printing job executed by the 3D printer 20 based on the object-shaping data obtained in Step S231 at the interrupt time obtained in Step S231 (S232). Then, the printer control device 40 ends the operation illustrated in FIG. 14.

In the operation of FIG. 14, the printing controller 45c uses the object-shaping data associated with the current target job and stored in the storage 44. The printing controller 45c may generate the object-shaping data again based on the 3D model data associated with the current target job and stored in the storage 44.

To restart the interrupted printing job, the three-dimensional object formed after the restart (hereinafter, "post-restart 3D object") may be directly formed on the table 25 or may be formed on the three-dimensional object already formed before the interrupt (hereinafter, "pre-interrupt 3D object"). In the former method, the post-restart 3D object is directly formed on the table 25 separately from the pre-interrupt 3D object, and the post-restart 3D object completed is then coupled to the pre-interrupt 3D object with an optional fixing means. In the latter method, the pre-interrupt 3D object is set on the table 25, and the post-restart 3D object starts to be formed thereon.

After a printing job executed by the 3D printer 20 is interrupted in Step S221, the printer control device 40 may allow the 3D printer 20 to execute another printing job before the interrupted printing job is restarted in Step S232. This may reduce a length of time after a printing job is commenced and before another printing job starts to be executed in the 3D printer 20.

The printer control device 40 may interrupt and restart a printing job in two different manners. The printing job may be interrupted by manipulating the cancel button 132f or by prearranging interrupt of the printing job on the preview of the preview display region 133f, in which case the reshaping button 142b, shift button 138a, and start button 132d are then serially manipulated to restart the interrupted printing job. The printing job may be suspended by manipulating the suspend button 132e, in which case the start button 132d is manipulated to restart the suspended printing job. In either case, at least a part of the object-shaping data used by the 3D printer 20 after the printing job is restarted may be changed in accordance with, for example, an instruction received through the operation unit 41.

The printer control device 40 prompts the 3D printer 20 to execute a part of the printing job as instructed on the preview instead of the whole printing job (S202 and S221). This may reduce a length of time after a printing job is commenced and before another printing job starts to be executed in the 3D printer 20.

The printer control device 40 receives an instruction on a part to be executed of the printing job via the preview. This may reduce any difference between an object that a user intends to print using the 3D printer 20 and an object actually printed by the 3D printer 20. In case the printer control device 40 interrupts the printing job by prompting the 3D printer 20 to execute a part of the printing job as instructed on the preview, an instruction on the printing job's part to be executed before the interrupt is received via the preview. This may reduce any difference between an object that a user intends to print using the 3D printer 20 and an object actually printed by the 3D printer 20 in both of a part of the printing job executed before the interrupt and another part of the printing job executed after the restart.

Figure 15:
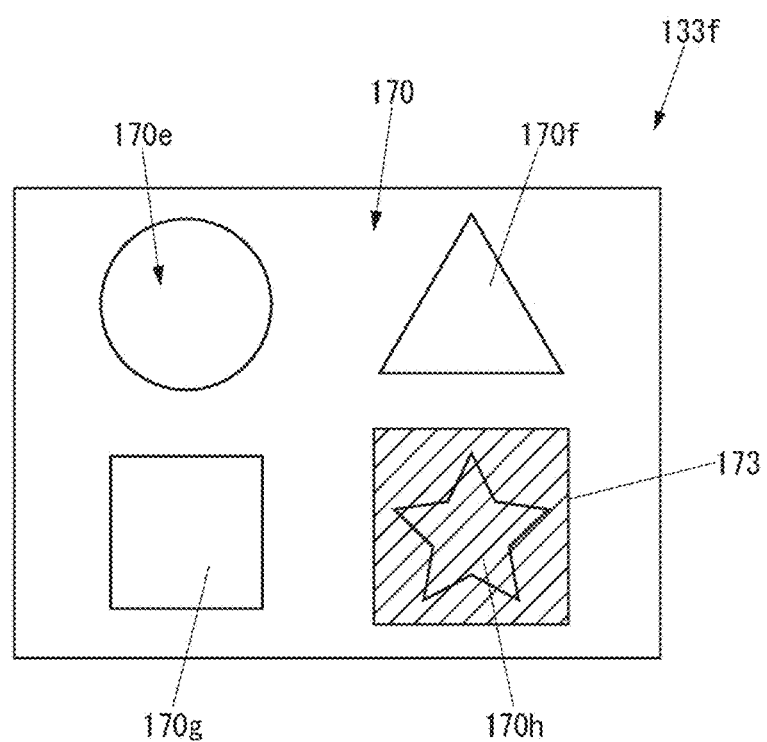
FIG. 15 is a drawing of an example of the preview display region illustrated in FIG. 5 that differs from FIGS. 6, 12, and 13.

In this embodiment, the printer control device 40 receives via the preview an instruction on a part in the vertical direction 20a of the three-dimensional object formed by the 3D printer 20. The printer control device 40 may receive via the preview an instruction on any part but a part in the vertical direction 20a of the three-dimensional object formed by the 3D printer 20. As illustrated in FIG. 15, the printer control device 40 may receive via the preview an instruction on a part in the horizontal direction of the three-dimensional object. In FIG. 15, the preview display region 133f displays thereon a preview in a view from the upper to lower side in the vertical direction 20a. On this preview, a structural part 170h, among structural parts 170e to 170h constituting the three-dimensional object 170, is marked with a range 173 to be highlighted.

The printer control device 40 generates the object-shaping data in which a part with a specified thickness has been added to the surface of the three-dimensional object (S214 or S216). This may allow the 3D printer 20 to form the three-dimensional object having the part added to its surface. The three-dimensional object formed by the 3D printer 20 as prompted by the printer control device 40 may have irregularities on its surface resulting from droplets of the UV inks 21a. Such irregularities, however, may be reduced by cutting off the part added to the object's surface.

The printer control device 40 prompts the 3D printer 20 to form the part added to the surface of the three-dimensional object using the same UV ink 21a as in the surface layer of a three-dimensional object obtainable from the object-shaping data assumed to be generated from the 3D model data without adding the part. This may allow the 3D printer 20 to form a three-dimensional object having its surface layer increased in thickness based on the object-shaping data assumed to be generated from the 3D model data without adding the part. The three-dimensional object formed by the 3D printer 20 as prompted by the printer control device 40 may have an external appearance suitably corresponding to the 3D model data after the part added to the object's surface is cut off.

In the printer control device 40 of this embodiment, the part-adding instruction receiver 45b receives, via the checkbox 133g or 133h, an instruction on whether to add a part with a specified thickness to the surface of the three-dimensional object. The specific thickness has a fixed value. The part-adding instruction receiver 45b may receive, on the current target job display region 131 via a text box or spin box, an instruction on the thickness of a part to be added to the surface of the three-dimensional object. The printer control device 40, when receiving an instruction on the thickness of a part to be added to the surface of the three-dimensional object, may allow the 3D printer 20 to form a three-dimensional object to which a part with any thickness desired by a user is added. The three-dimensional object formed by the 3D printer 20 as prompted by the printer control device 40 may have irregularities on its surface resulting from droplets of the UV inks 21a. By receiving an instruction on the thickness of a part to be added to the surface of the three-dimensional object, however, such irregularities may be reduced by cutting off the added part on the surface in an appropriate thickness.

In this embodiment, the printer control device 40 is allowed to change whether to add a part with a specified thickness to the surface of the three-dimensional object depending on whether the clear layer or the color layer is formed on the object's surface. In the printer control device 40, the part-adding instruction receiver 45b may receive an instruction on whether to add a part with a specified thickness to the surface of the three-dimensional object irrespective of the type of the UV ink 21a used to form the object's surface layer.

In the three-dimensional object manufacturing system 10 of this embodiment, the GUI 100 is displayed on the display unit 42 of the printer control device 40. In the three-dimensional object manufacturing system 10, a GUI similar to the GUI 100 may be displayed on the display unit 32 of the 3D printer 20. The GUI displayed on the display unit 32 of the 3D printer 20 may be manipulated, for example, via the operation unit 31.

The three-dimensional object manufacturing system 10 of this embodiment includes the 3D printer 20 and the printer control device 40. In the three-dimensional object manufacturing system 10, the printer control device 40 may be dispensable in so far as the 3D printer 20 is equipped with functions required of the printer control device 40.

This embodiment describes the three-dimensional object manufacturing system, i.e., three-dimensional printing system. This disclosure is also applicable to two-dimensional printing systems.

What is claimed is:

1. A non-transitory computer readable medium stored with a printing control program of an inkjet printer which is a 3D printer that forms a three-dimensional object, the printing control program being configured to run on a computer to implement:

an object-shaping data generator that generates object-shaping data processable by the inkjet printer from 3D model data;

a printing controller that prompts the inkjet printer to perform a printing operation and interrupt the printing operation;

an interrupt time storing unit that stores an interrupt time of a printing job executed by the inkjet printer when the printing job is interrupted by the printing controller; and a part-adding instruction receiver that receives an instruction on whether to add a part with a specified thickness to a surface of the three-dimensional object, the printing controller prompting the inkjet printer to form the three-dimensional object based on the object-shaping data generated by the object-shaping data generator, the printing controller restarting the printing job at the interrupt time stored by the interrupt time storing unit and prompting the inkjet printer to execute another printing job after the printing job is interrupted and before the printing job interrupted is restarted, the object-shaping data generator generating the object-shaping data to which the part is added when an instruction to add the part is received by the part-adding instruction receiver.

2. The non-transitory computer readable medium according to claim 1, the printing control program being configured to run on the computer to further implement:

a display controller that displays a preview of the printing job executed by the inkjet printer on a display device; and a partial printing instruction receiver that receives an instruction to execute a part of the printing job via the preview displayed on the display device by the display controller, wherein the printing controller interrupts the printing job by prompting the inkjet printer to execute the part of the printing job when the instruction to execute the part is received by the partial printing instruction receiver.

3. The non-transitory computer readable medium according to claim 1, wherein the part is formed from an ink identical to an ink used to form a surface layer of the three-dimensional object in the object-shaping data assumed to be generated based on the 3D model data without adding the part.

4. The non-transitory computer readable medium according to claim 3, wherein the part-adding instruction receiver receives an instruction on the specified thickness.

5. The non-transitory computer readable medium according to claim 1, wherein the part-adding instruction receiver receives an instruction on the specified thickness.

6. A printing control device of an inkjet printer which is a 3D printer that forms a three-dimensional object, comprising:

an object-shaping data generator that generates object-shaping data processable by the inkjet printer from 3D model data;

a printing controller that prompts the inkjet printer to perform a printing operation and interrupt the printing operation;

an interrupt time storing unit that stores an interrupt time of a printing job executed by the inkjet printer when the printing job is interrupted by the printing controller; and a part-adding instruction receiver that receives an instruction on whether to add a part with a specified thickness to a surface of the three-dimensional object, the printing controller prompting the inkjet printer to form the three-dimensional object based on the object-shaping data generated by the object-shaping data generator, the printing controller restarting the printing job at the interrupt time stored by the interrupt time storing unit and prompting the inkjet printer to execute another printing job after the printing job is interrupted and before the printing job interrupted is restarted, the object-shaping data generator generating the object-shaping data to which the part is added when an instruction to add the part is received by the part-adding instruction receiver.

7. A printing control method for an inkjet printer which is a 3D printer that forms a three-dimensional object, comprising:

an object-shaping data generating step of generating object-shaping data processable by the inkjet printer from 3D model data;

a printing control step of prompting the inkjet printer to perform a printing operation and interrupt the printing operation;

an interrupt time storing step of storing an interrupt time of a printing job executed by the inkjet printer when the printing job is interrupted by the printing controller; and a part-adding instruction receiving step of receiving an instruction on whether to add a part with a specified thickness to a surface of the three-dimensional object, the printing control step comprising a step of prompting the inkjet printer to form the three-dimensional object based on the object-shaping data generated by the object-shaping data generator, the printing control step further comprising a step of restarting the printing job at the interrupt time stored in the interrupt time storing step, and a step of allowing the inkjet printer to execute another printing job after the printing job is interrupted and before the printing job interrupted is restarted, the object-shaping data generating step comprising a step of generating the object-shaping data to which the part is added when an instruction to add the part is received at the part-adding instruction receiving step.

* * * * *